(12) United States Patent
Yang et al.

(10) Patent No.: US 11,013,081 B1
(45) Date of Patent: May 18, 2021

(54) CONTINUOUS LIGHT DIMMING CIRCUIT

(71) Applicant: LONGHORN INTELLIGENT TECH CO., LTD, Shenzhen (CN)

(72) Inventors: Haitao Yang, Shenzhen (CN); Shaofeng Huang, Shenzhen (CN); Lin Yang, Shenzhen (CN); Yangyang Luo, Shenzhen (CN)

( * ) Notice: Subject to any disclaimer, the term of this patent is extended or adjusted under 35 U.S.C. 154(b) by 0 days.

(21) Appl. No.: 17/081,453

(22) Filed: Oct. 27, 2020

(51) Int. Cl.
*H05B 45/325* (2020.01)
*H05B 45/10* (2020.01)
*H05B 47/20* (2020.01)
*H05B 47/16* (2020.01)

(52) U.S. Cl.
CPC ........... *H05B 45/325* (2020.01); *H05B 45/10* (2020.01); *H05B 47/16* (2020.01); *H05B 47/20* (2020.01)

(58) Field of Classification Search
CPC ...... H05B 45/325; H05B 47/16; H05B 45/10; H05B 47/20
See application file for complete search history.

(56) References Cited

U.S. PATENT DOCUMENTS

2012/0230073 A1* 9/2012 Newman, Jr. .......... H05B 45/14
363/126
2014/0126261 A1* 5/2014 Newman, Jr. .......... H05B 45/10
363/128

* cited by examiner

*Primary Examiner* — Minh D A
(74) *Attorney, Agent, or Firm* — Clement Cheng (57) ABSTRACT

A light dimming circuit has a continuous dimming function that includes a power supply and a light source module formed as a lamp. A power switch is connected to a power supply and receives a user input when the user turns on and turns off power. A light source drive circuit is connected to the power switch and the light source module. The light source drive circuit detects a switch on time and a switch off time, generates a light source drive signal according to the switch on time and the switch off time, and saves the light source drive signal and drives the light source module to illuminate. The light source drive signal controls a brightness of the light source module. The brightness of the light source module is adjusted to provide a continuous dimming function according to the switch on time and the switch off time.

7 Claims, 7 Drawing Sheets

CONTINUOUS LIGHT DIMMING CIRCUIT

FIELD OF THE INVENTION

The present invention relates to the field of lighting, in particular to a driving and dimming circuit.

DISCUSSION OF RELATED ART

As LED lamps have improved over time, they have replaced fluorescent lamps in general lighting applications. With higher high luminous efficiency and low energy consumption, LED lamps are now popular for general lighting in homes and businesses. This new found popularity has increased demand for dimmable control in LED products. At present, the dimming methods applied to LED lighting products generally include: SCR dimming, remote control dimmers, wall switches, and some commercial lighting dimming systems, such as 0-10V, etc. However, the straight tube format LED lamp, which is widely used in commercial lighting, has problems such as poor dimming mode compatibility and sudden light output changes in different modes, which limits use of the straight tube format LED lamp.

The current state-of-the-art of thyristor dimming, wireless dimming (including Bluetooth, WIFI, Ziggbee, infrared, microwave, etc.), and switch-controlled segmented dimming can all be used on straight-tube LED lights. These techniques have drawbacks, for example for the thyristor dimming method, the power factor will become very poor under light load conditions. Other techniques create light output jitter and dimming noise pollution. Furthermore, for the North American market, there are different types of household current, namely 120V AC and there are two kinds of lighting grids with 277V alternating current, and the thyristor dimming method is less suitable for dimming control under 277V lighting conditions. The wireless dimming method has achieved good results in the dimming effect. However, wireless dimming requires the help of a dedicated dimming controller or an APP of an electronic device (such as a mobile phone) to adjust the output, which has a high application cost. Another important constraint is that, because it is wireless dimming, a wireless communication module needs to be built into each product. The price of wireless communication modules is relatively high, resulting in a substantial increase in the unit price of the finished product. For switch segment dimming, it is obvious that its dimming state has only a few modes (usually 3 to 4 modes), that is, the difference in light output between different modes is very large which is to abrupt light output change.

SUMMARY OF THE INVENTION

To solve the above technical problems, the embodiments of the present application provide a light source driving circuit and a light source driving circuit. An object of the invention is to improve the light dimming circuit and solve some of the problems currently facing linear LED lamps in commercial lighting, such as poor dimming mode compatibility and sudden light output changes during mode change.

The first aspect of the present application provides a light source driving circuit capable of continuous dimming, which is connected to the light source module, and the light source driving circuit includes: a switch circuit, a turn on time and turnoff time of the circuit, a signal, a timing unit, a preset smart dimming interval time, a pulse trigger unit, and a latch unit. The power switch is connected to the power supply and is used to turn on and off according to user operations. The drive circuit is respectively connected to the power switch and the light source module to detect the switch. The turn-on time and turn-off time of the circuit, generates a light source driver according to the turn-on time and the turn-off time. A signal drives the light source module to light up. The light source drive signal is used to adjust the brightness of the light source module.

Optionally, the driving circuit includes a timing unit for timing the on time and off time of the switch circuit. Comparing the on time with a preset smart dimming interval time can generate a first comparison result. Comparing the off time with the preset state latch interval time can generate a second comparison result. A pulse trigger unit connected to the timing unit is preferably configured to generate a pulse trigger signal according to the first comparison result and the second comparison result. A latch unit records the pulse trigger signal. A light source drive unit is connected to the pulse trigger unit and the latch unit, and records the pulse trigger signal. The pulse trigger signal generates a light source drive signal.

Optionally, the driving circuit further includes a latch reset unit that is connected to the timing unit and the latch unit, and configured to perform according to the second comparison result. The comparison result performs a reset processing on the latch unit. Optionally, the light source driving circuit includes: a display circuit, connected to the pulse trigger unit, and configured to generate a pair according to the pulse trigger signal.

The corresponding display signal drives the indicator light to light up. Optionally, the light source driving circuit includes a leakage protection safety circuit, configured to perform voltage sampling and current sampling on the power supply. The grid impedance value is compared with a preset impedance threshold value, and the connection state between the light source module and the power supply is controlled according to the comparison result.

Optionally, the leakage protection safety circuit includes: a voltage sampling unit configured to perform voltage sampling on the power supply to generate a voltage sampling signal; and a current sampling unit configured to perform current sampling on the power supply to generate a current sampling signal. The leakage protection unit is respectively connected to the voltage sampling unit and the current sampling unit. The voltage sampling signal and the current sampling signal generate a grid impedance value. The preset impedance threshold is compared, and a leakage protection signal is generated according to the comparison result to adjust the light source driving signal. Optionally, the leakage protection safety circuit further includes a leakage switch unit connected to the leakage protection unit and configured to receive the leakage protection signal. According to the leakage protection signal, the connection state between the light source module and the power supply is controlled.

Optionally, the power switch is a wall switch. An embodiment of the present application also provides a light source driving device. The embodiment of the present application also provides a lamp. The lamp includes a light source module. The light source drive circuit is c preferably connected to the light source module pick up.

The embodiment of the present application provides a light source driving circuit, a light source driving device and a lamp capable of continuous dimming. The continuous light dimming circuit receives an input from the turn-on and turn-off of the switch circuit. The turn-on time and turn-off time of the turn-off circuit are detected, and a light source drive signal is generated according to the turn-on time and the turn-off time to drive the light source module to light. The light source drive signal is used to control the brightness of the light source module, and adjust the brightness of the light source module by turning on and off the switch circuit, which solves the problem of poor dimming compatibility and light output in different gears for straight-tube LED lamps that are more commonly used in commercial lighting. Problems such as sudden changes have greatly restricted the application scenarios of straight-tube LED lights.

The LED light has gradually replaced traditional light sources due to low energy consumption, no pollution, no mercury, and long life. Demand for dimmable control in LED products is becoming increasingly urgent.

The make the technical problems, technical solutions, and beneficial effects to be solved by this application clearer, the following further describes this application in detail with reference to the accompanying drawings and embodiments. It should be understood that the specific embodiments described here are only used to explain the application, but not to limit the application. It should be noted that when an element is referred to as being "fixed to" or "disposed on" another element, it can be directly on the other element or indirectly on the other element. When an element is said to be "connected to" another element, it can be directly connected to the other element or indirectly connected to the other element. It should be understood that the terms "length", "width", "upper", "lower", "front", "rear", "left", "right", "vertical", "horizontal", "top" The orientation or positional relationship indicated by "bottom", "inner", "outer", etc. is based on the orientation or positional relationship shown in the drawings, and is only for the convenience of describing the application and simplifying the description, and does not indicate or imply the pointed device or the element must have a specific orientation, be constructed and operated in a specific orientation, and therefore cannot be understood as a limitation of the application. In addition, the terms "first" and "second" are only used for descriptive purposes, and cannot be understood as indicating or implying relative importance or implicitly indicating the number of technical features indicated. Therefore, the features defined with "first" and "second" may explicitly or implicitly include one or more of these features. In the description of this application, "plurality" means two or more, unless otherwise clearly defined.

SUMMARY OF THE CLAIMS

A light dimming circuit has a continuous dimming function that includes a power supply and a light source module formed as a lamp. A power switch is connected to a power supply and receives a user input when the user turns on and turns off power. A light source drive circuit is connected to the power switch and the light source module. The light source drive circuit detects a switch on time and a switch off time, generates a light source drive signal according to the switch on time and the switch off time, and saves the light source drive signal and drives the light source module to illuminate.

The light source drive signal controls a brightness of the light source module. The brightness of the light source module is adjusted to provide a continuous dimming function according to the switch on time and the switch off time.

Optionally, the light source driving circuit also includes a timing unit for timing the switch on time and the switch off time of the switch circuit. The timing unit is configured to compare the switch on time and the switch off time with a preset intelligent dimming interval time to generate a first comparison result. The timing unit also compares the switch on time and the switch off time with a preset latch interval time to generate a second comparison result. A pulse trigger unit is connected to the timing unit is configured to generate a pulse trigger signal based on the first comparison result and the second comparison result.

A latch unit saves the pulse trigger signal. A light source driving unit is connected to the pulse trigger unit and the latch unit and generates a light source drive signal based on the pulse trigger signal. The light dimming circuit has a latch reset unit connected to the timing unit and the latch unit. The latch reset unit resets the latch unit according to the second comparison result. The light dimming circuit may have a display circuit connected to the pulse trigger unit. The display circuit generates a pair of display signals to illuminate an indicator light.

The light dimming circuit may have a leakage protection safety circuit that samples a voltage and a current of the power supply to generate a grid impedance value. The leakage protection safety circuit also compares the grid impedance value with a preset impedance threshold and controls a connection state between the light source module and the power supply. The leakage protection safety circuit preferably includes a voltage sampling unit. The voltage sampling unit is configured to sample voltage on the power supply to generate a voltage sampling signal. A current sampling is configured to perform current sampling on the power supply to generate a current sampling signal. The leakage protection safety circuit is connected to the voltage sampling unit and the current sampling unit. The leakage protection safety circuit is configured to receive a voltage sampling signal and a current sampling signal to generate a grid impedance value. The grid impedance value is compared with a preset impedance threshold. A leakage protection signal is generated according to the grid impedance value. The leakage protection signal adjusts the light source driving signal.

The leakage protection safety may also have a leakage switch unit. The leakage switch unit is connected to the leakage protection unit and receives the leakage protection signal to control a connection state between the light source module and the power supply according to the leakage protection signal. The power switch can be a standard two gang toggle wall switch.

The following callout list of elements can be a useful guide in referencing the element numbers of the drawings.
10 power supply 20 power switch
30 light source driving circuit
31 timing unit
32 pulse trigger unit
33 latch unit
34 light driver
35 latch reset unit
40 light source module
50 display circuit
60 electrical leakage protection path
81 circuit
82 leakage protection circuit
83 main control circuit
84 power supply circuit
85 main power circuit
101 Switch Activation
102 Recall dimming setting
103 Light Level reached?
104 intelligently adjust dimming
105 Define dimming setting as 100% lamp brightness
106 Save dimming setting
107 Light Switched Off
108 Second Switch Activation
109 Recall Of The Storage Gap Setting
BD1 rectifier bridge
COMP compensation signal pin
CS current sampling terminal
C1 capacitor
C2 second capacitor
C10 tenth capacitor
C11 eleventh capacitor
C12 twelfth capacitor
C13 thirteenth capacitor
C14 Fourteenth capacitor
C15 fifteenth capacitor
C16 sixteenth capacitor
C17 seventeenth capacitor
C18 eighteenth capacitor
C19 nineteenth capacitor
C20 twentieth capacitor
C21 twenty-first capacitor
CLK clock signal terminal
DC output high-voltage
D1 first diode
D2 second diode
D10 tenth diode
D11 eleventh diode
D12 twelfth diode
D13 thirteenth diode
D14 fourteenth diode
DRAIN input pin
EC1 first terminal of the first electrolytic capacitor
F1 first fuse
GATE light source drive signal pin
GND ground pin
LED+ positive terminal
PWM signal input pin
Q1 first switch tube
Q10 tenth switch tube
Q11 eleventh switch tube
Q12 twelfth switching tube
L1 first inductor
L2 second inductor
NP sampling pin
R1 first resistor
R2 second resistor
R3 third resistor
R5 fifth resistor
R6 sixth resistor
R7 seventh resistor
R8 eighth resistor
R9 ninth resistor
R10 tenth resistor
R11 eleventh resistor
R12 twelfth resistor
R13 thirteenth resistor
R14 fourteenth resistor
R15 fourteenth resistor
R16 sixteenth resistor
R17 seventeenth resistor
R18 eighteenth resistor
R19 nineteenth resistor
R20 twentieth resistor
R21 twenty-first resistor
22 twenty-second resistor
R23 twenty-third resistor
R24 24th resistor
R25 25th resistor
R26 26th resistor
R27 27th resistor
R28 28th resistor
R29 29th resistor
R30 30th resistor
R31 Thirty-first resistor
R32 thirty-second resistor
RS1 first sampling resistor
RS2 second sampling resistor
RS3 first end of the sampling resistor
RS4 fourth sampling resistor
T1-A first inductor
T1-B second inductor
T1 first transformer
U1 light source drive chip
U2 sampling drive chip
U3 leakage protection chip
U4 Control chip
U5 power supply chip
U6 main power chip
VCC power supply pin
VCC2 output terminal
VR variable resistor
VSS the ground pin
ZD10 tenth voltage regulator
ZD11 eleventh voltage regulator

DETAILED DESCRIPTION OF THE PREFERRED EMBODIMENT

Figure 1:
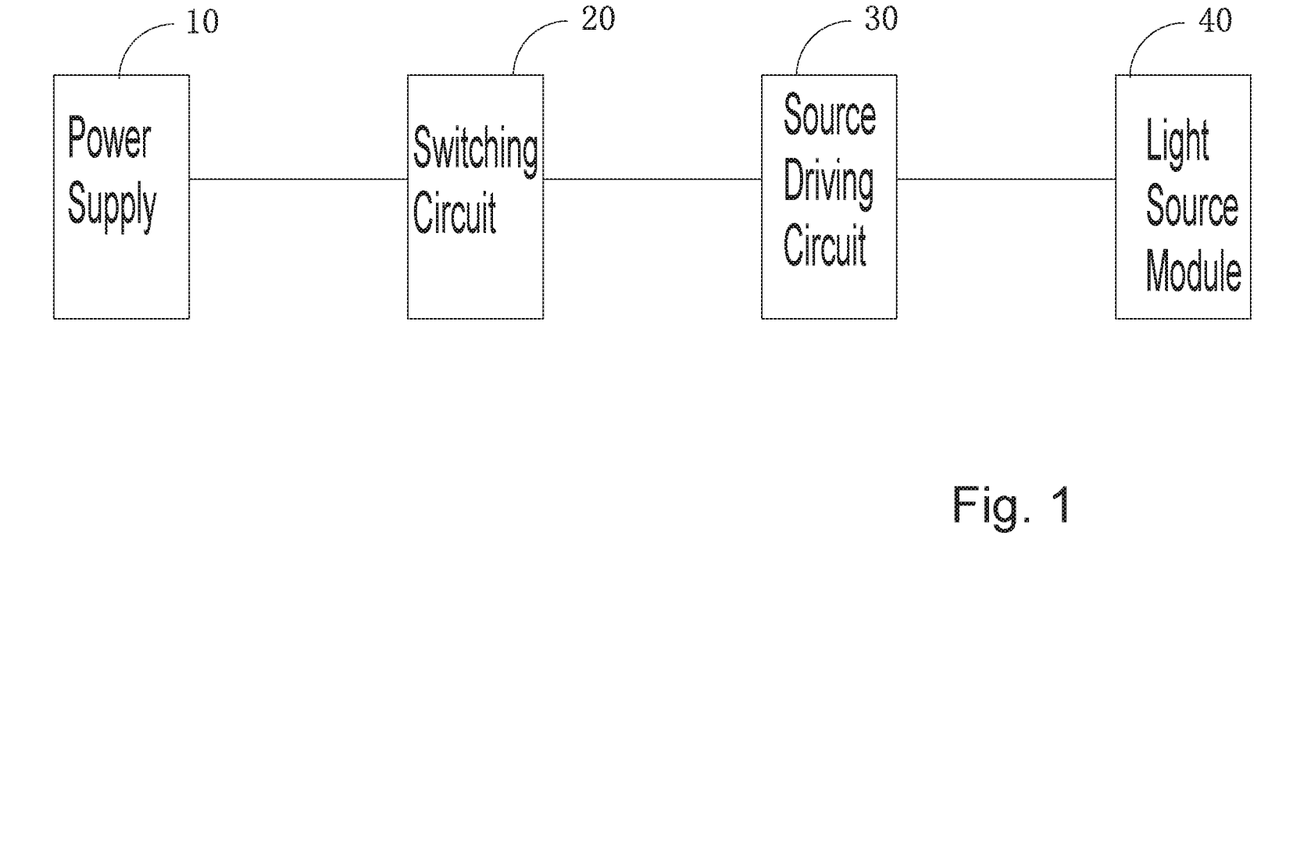
FIG. 1 is a block diagram of the continuous light dimming circuit.

The present invention is a continuously dimming circuit for a driver and a lamp. As seen in FIG. 1 a block diagram of a light source driving circuit 30 is an LED driver circuit capable of continuous dimming according to an embodiment of the application. As shown in FIG. 1, the light source driving circuit 30 is connected to the light source module 40. Specifically, the light source driving circuit 30 includes a switch. The power switch 20 is connected to the power supply 10 for turning on and off according to user input. The light source drive circuit 30 is connected to the power switch 20 and the light source module 40 for detecting the power switch 20.

The light source drive signal is generated according to the on time and the off time to drive the light source module 40 to light up. The light source drive signal is used to adjust the brightness of the light source module 40. For example, the power switch 20 is performing open-close-open modulation which could be pulse width modulation. During operation, its first turn-on time, that is the turn-on time of the power switch 20, has the same turn-on time set from a previous use. The corresponding light source drive signal corresponds to a brightness setting, for example, if the open time range is 10 ms-10000 ms, then each point between 10 ms and 10000 ms can correspond to a light source drive signal. For example, with an interval of 1 ms, the light source module 40 has 9990 brightness levels.

Further, the user can also input the corresponding opening time through the input component to control the time length of the first opening time of the power switch 20 during the opening-closing-opening operation. If the user inputs 1000 ms and the timer reaches 1000 ms, the power switch 20 is automatically turned off at this time, and the drive circuit 30 records the signal generated based on the on time before the power switch 20 is turned off, and when it turns on again within the preset time the corresponding light source driving signal is generated based on the signal to drive the light source module 40 to light, and there is no need to manually perform the opening action at this time, so as to avoid the time error caused by the user manually performing the opening action.

In this application, by controlling the on and off of the power switch 20, the drive circuit 30 generates a corresponding light source drive signal based on the on time and off time, and adjusts the brightness of the light source module 40, so as to achieve continuous adjustment.

The user can set a dim light by quickly flicking on and off the switch, thus effectively sending a single pulse width modulation signal which is stored for reference. The user can set a brighter light, by turning on the switch, and then waiting a ten seconds before turning off the switch. The light starts dim and becomes brighter to give the user a reference of how bright the light is until the user sets the light brightness by turning off the light. When the user turns the light back on again, the light is preset at the previous dimming level.

The power switch 20 can be a wall switch with a toggle such as a decora style toggle. In addition to the function of turning on and off the current on the power line in our traditional sense, the power switch 20 also has an important function, which is to turn on-off through a switch. The off-on operation sequence, and based on the time interval of different lengths between the corresponding actions, generates the corresponding light source driving signal. In this embodiment, the driving circuit 30 is a key core circuit, which is connected to the lamp holder to convert the energy in the AC power grid, and at the same time, it receives the signal from the power switch 20, and recognizes and converts the switching signal of the power switch 20. As an internal control signal, the output of the driving circuit 30 is adjusted to transfer energy to the light source module 40 according to the predetermined requirements, so as to effectively control the brightness of the light source module 40.

The present invention allows easy retrofitting because the original switch does not need to be changed. Only the lamp needs to be retrofit, which does not affect the wiring. In the example, the light source module 40 with the drive circuit 30 is installed, and then the light source module 40 can be continuously dimmed using the same switch. Specifically, in the present application, the switching circuit 20 is used to perform the on or off operation, thereby introducing the general state switching time interval. Then the drive circuit 30 generates the light source drive signal based on the on time and off time of the power switch 20.

To adjust the brightness of the light source module 40, when the power switch 20 performs the operation "turn on-turn off-turn on", there is a time between when the power switch 20 is turned on to when it is turned off. It is called the "smart dimming interval". From the power switch 20 is turned off to the power switch 20 is turned on again, there is a period of time called the "state latch interval". When the user executes the power switch 20, the turn-on and turn-off operations are combined with the interval time of the two operations at the same time to generate different combinations, and the subsequent drive circuit 30 generates corresponding light source drive signals based on the different time combinations.

Figure 2:
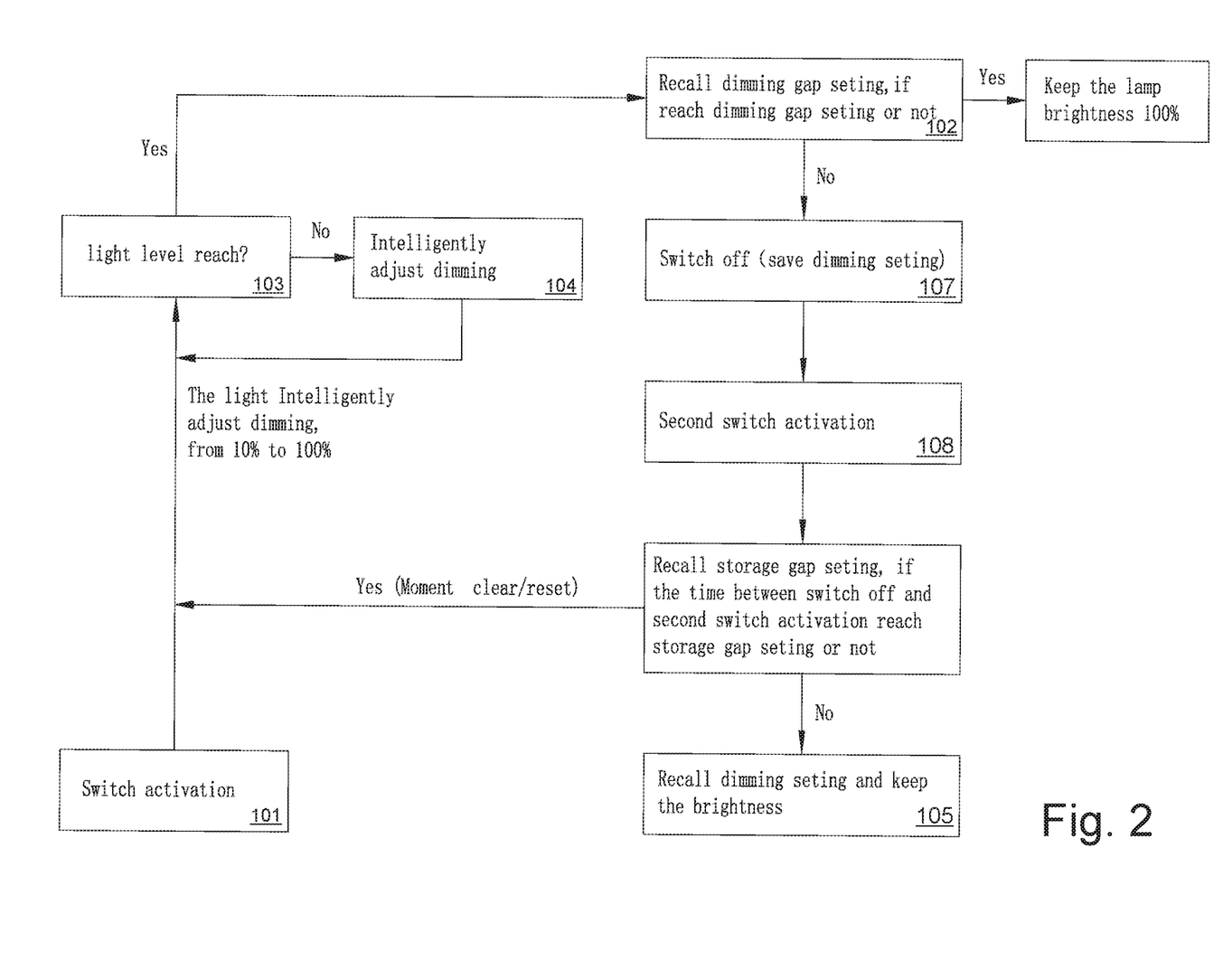
FIG. 2 is a schematic flow diagram of the dimming step performed by the driving circuit provided by an embodiment of the application.

As seen in FIG. 2, the logic of the continuous light dimming circuit begins at switch activation 101. The dimming setting increases or decreases light level until a desired light level is reached 103. The control system then recalls dimming setting 102 when the light level is reached. Until the light level is reached, the circuit intelligently adjusts dimming the level 104. When the dimming gap setting is reached, the light is switched off 107 which saves the dimming setting and defines the setting as 100% lamp brightness 105. The second switch activation 108 activates a recall of the storage gap setting 109. If the time between the switch off and the second switch activation reached the storage gap setting which is a set amount of time, then the memory can be cleared or the logic can recall the dimming setting and keep the brightness 105. If the memories cleared, the light level reached 103 continues to operate.

The driving circuit 30 performs a dimming step based on the state switching of the power switch 20. Specifically, the power switch 20 can be a wall switch and a light source module 40 can be an LED tube. When the LED tube is required to work at 100% full brightness, the wall switch is turned on (that is, the power switch 20 is in the on state), the LED light enters the intelligent dimming stage, and the brightness continues to increase. Without any intervention (that is, no action is performed on the power switch 20 at this time), after the smart dimming time ends, the on time of the power switch 20 reaches the preset smart dimming interval, and the LED lights are at full brightness output and keep the current working state.

If it is in some specific occasions that the LED light needs to be controlled at a fixed brightness to work continuously, after the wall switch is turned on, the user observes the brightness of the LED light. In the dimming mode, during this short period of time in the entire smart dimming interval, the LED lights continue to increase in brightness from the lowest brightness to the highest brightness. When the desired state is reached, the wall switch is turned off. The dimming state at the turnoff time is recorded. The LED light output before the power disconnection is saved. The current and voltage corresponding to the brightness of the LED light before the power turnoff are preferably saved. If the wall switch is turned on again within the state latch interval, the light reverts to the saved settings. When the circuit 30 is powered on, the LED lamp tube maintains a locked state to work. The LED lamp is driven to light up according to the current and voltage corresponding to the brightness of the LED lamp before the power is turned off, thereby completing the adjustment of the brightness of the LED lamp.

Figure 3:
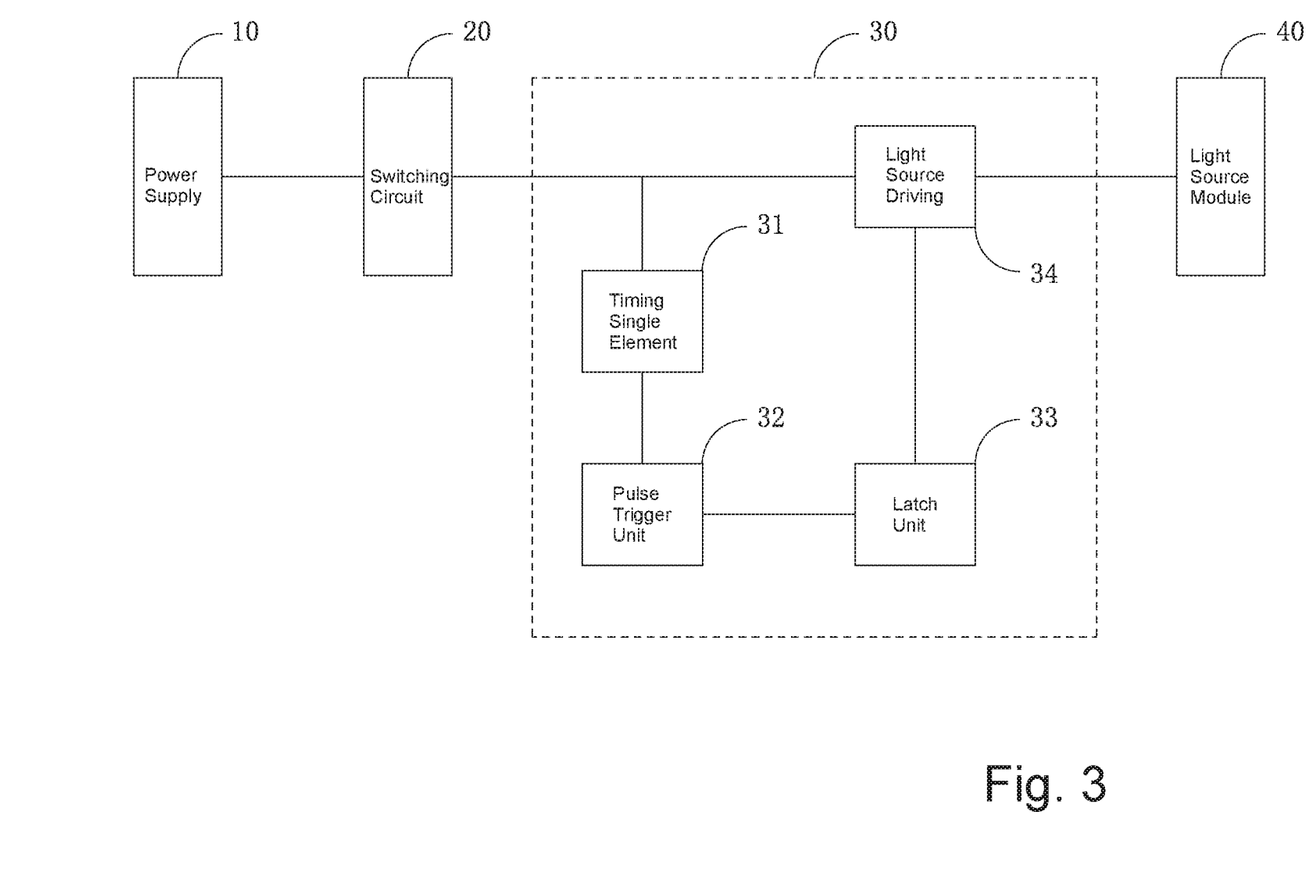
FIG. 3 is a block diagram of the continuous light dimming circuit.

In one embodiment, referring to FIG. 3, the driving circuit 30 in this embodiment includes a timing unit 31. Pulse trigger unit 32, latch unit 33, and light source drive unit 34, specifically, timing unit 31 is used to time the on time and off time of the power switch 20, and compare the on time with the preset smart dimming interval time to generate the first comparison result, and lock the off time with the preset state. The device stores the interval time for comparison to generate the second comparison result. The pulse trigger unit 32 is connected to the timing unit 31 to generate pulse trigger signals according to the first comparison result and the second comparison result. The latch unit 33 is used to record pulse trigger signals. The light source driving unit 34 is connected to the pulse trigger unit 32 and the latch unit 33 and is used to trigger signals according to the pulse generated light source drive signal.

The timing unit 31 counts the on time and off time of the power switch 20, and compares the on time with the preset smart dimming interval time to generate the first comparison result. The pulse trigger unit 32 generates a corresponding pulse trigger signal based on the first comparison result and the second comparison result. The latch unit 33 records the pulse trigger signal, and the light source driving unit 34 generates a light source driving signal based on the pulse trigger signal to reduce the brightness of the light source module 40.

To make adjustments for example, if the on-time of the power switch 20 is greater than or equal to the preset smart dimming interval time, the pulse trigger unit 32 generates a corresponding pulse trigger signal based on the first comparison result, and the latch unit 33 latches and records. If the parallel light source driving unit 34 generates a corresponding light source driving signal based on the pulse trigger signal, it controls the light source module 40 to maintain a state of 100% brightness. If the on time of the power switch 20 is less than the preset intelligent dimming interval time, the timing unit 31 re-times the off time of the power switch 20, and if the off time is less than the preset state latch interval time, the pulse trigger unit 32 generates a corresponding pulse trigger signal based on the second comparison result, and the latch unit 33 records the pulse trigger signal. This happens when the power switch 20 is turned on within the preset state latch interval time.

The pulse trigger signal and the switch define a desired brightness. The brightness of the light source module 40 before the circuit 20 is disconnected corresponds to the preset light level. The light source driving unit 34 corresponds to the light source drive signal. The corresponding light source drive signal is based on the pulse trigger signal to drive the light source module 40 to light up with the preset brightness before the power switch 20 is disconnected. The light source module 40 thus has adjustable brightness.

Figure 4:
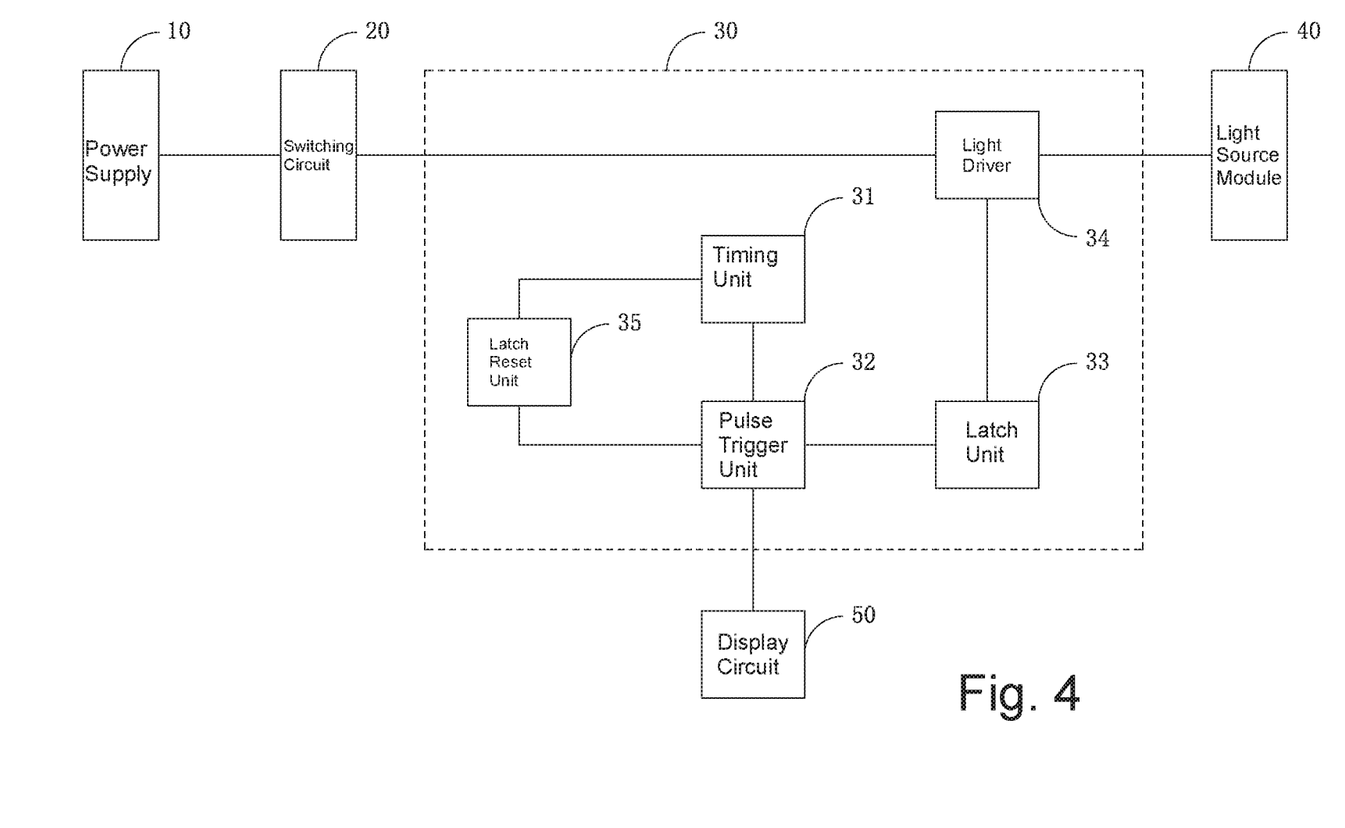
FIG. 4 is a block diagram of the continuous light dimming circuit.

As seen in FIG. 4, the driving circuit 30 in this embodiment further includes a latch reset unit 35, which is connected to the timing unit 31 and the latch unit 33. The latch reset unit 35 works with the timing unit and the pulse trigger unit 32 to reset the latch unit 33. If the timing unit 31 re-times the turn-off time of the power switch 20, and the turn-off time is greater than or equal to the preset state latch interval time, the pulse trigger unit 32 generates a corresponding pulse trigger signal based on the second comparison result, and the latch unit 33 records the pulse trigger signal so that the latch reset unit 35 resets the latch unit 33. This clears the latch unit 33 so that a user can reset another dimming level. The dimming step of the drive circuit 30 is interrupted, and the drive circuit 30 needs to execute again as shown in FIG. 2 which shows the steps of defining a present dimming level.

As shown in FIG. 4, the light source driving circuit 30 includes a display circuit 50, which is connected to the pulse trigger unit 32, and is configured to generate a corresponding display signal according to the pulse trigger signal to drive the indicator light to light up. In this embodiment, the display circuit 50 generates a corresponding display signal based on the pulse trigger signal to drive the indicator light. For example, if the on time of the power switch 20 is less than the preset smart dimming interval time, the pulse trigger unit 32 generates a corresponding pulse trigger signal based on the conduction time of the power switch 20. The pulse trigger signal corresponds to the brightness of the light source module 40. The longer the conduction time, the greater the brightness of the light source module 40.

Optional indicator lights can provide remote operation. Instead of having the brightness of the light source module 40 judged based solely on the naked eye, the current brightness of the light source module 40 can be determined by providing multiple indicator lights or based on a color of the indicator lights, so as to select the appropriate brightness to turn off the power switch 20. The conduction time of the power switch 20, for example, if 20 indicator lights are set, the user can judge the brightness of the light source module 40 at this time by the number of indicator lights, or the indicator light can be set in the form of a light bar. By observing the progress of the light bar, the current brightness of the light source module 40 is determined. Further, judging the condition of the light source module 40 by the indicator light can also allow remote operation away from the light source module 40. After the user disconnects the power switch 20, the brightness of the light source module 40 before the power switch 20 is disconnected is latched and recorded by the latch unit 33. When the power switch 20 is turned on, the light source drive unit 34 reads the latched pulse trigger signal, and generates a corresponding light source drive signal based on the pulse trigger signal.

Alternatively, the wall switch can have a dimming status display, and the display circuit 50 can be an LED indicator. The dimming status can be is displayed through the indicator. The timing unit 31, the pulse trigger unit 32, and the latch unit 33 can all be placed inside a housing of the wall switch, and the indicator light can be installed on the surface of the wall switch. The intelligent dimming interval time and the status latch interval time are preset in the timing unit 31, and the pulse trigger unit 32 drives the LED indicator to reflect the current LED light. The latch unit 33 can temporarily store the preset level in the pulse trigger unit 32 when the wall switch 20 is turned off.

The main power switch also called the power switch 20 is turned on, the display circuit 50 starts at the same time, and the timing unit 31 starts timing. During the smart dimming interval, the light output of the LED tube increases smoothly from the lowest brightness. For example, when the brightness reaches 10%, the pulse trigger unit 32 drives the first indicator light to light up. Wen the brightness reaches 20%, the second indicator light also lights up and so on until the time reaches the intelligent dimming interval when the LED output is at 100% brightness, and the corresponding ten indicator lights are all remaining on.

When the brightness of the LED tube needs to be selected, the indicator shows the corresponding state. The user turns off the wall switch, and the drive signal of the pulse trigger unit 32 (aka the pulse trigger signal) is placed in the latch unit 33. At this time, the timing unit 31 starts timing again. Before reaching the state latch interval of the LED tube, the wall switch is turned on, and the pulse trigger unit 32 reads the recorded value from the latch unit 33 and drives the indicator light on the display circuit 50. The lamp tube also continues to work according to the brightness before the power failure, so as to implement the correspondence between the LED lamp brightness output and the indicator light display.

In one embodiment, the light source driving circuit 30 includes a leakage protection safety circuit. The leakage protection safety circuit is used to sample the voltage and current of the power supply 10 to generate a grid impedance value, and compare the grid impedance value with a preset impedance threshold. The light source module 40 with the power supply 10 controls the connection status. In this embodiment, the voltage sampling and current sampling of the power supply 10 are performed by the leakage protection safety circuit. Sampling is used to generate the grid impedance value. The grid impedance value is compared with a preset impedance threshold. The connection state between the light source module 40 and the power supply 10 is controlled according to the comparison result.

Optionally, the leakage protection safety circuit includes a voltage sampling unit, a current sampling unit, and a leakage protection unit. The voltage sampling unit is used to perform voltage sampling on the power supply 10 to generate a voltage sampling signal. The current sampling unit is used to perform current sampling and generate a current sampling signal. The leakage protection unit is respectively connected with the voltage sampling unit and the current sampling unit, and is used to generate the grid impedance value according to the voltage sampling signal and the current sampling signal. Comparing the grid impedance value with the preset impedance threshold provides a comparison result. The comparison result generates a leakage protection signal to adjust the light source driving signal.

In an embodiment, the leakage protection safety circuit further includes a leakage switch unit, and the leakage switch unit connected to the leakage protection unit, used to receive the leakage protection signal. The leakage protection signal to the light source module controls the connection state between the light source module 40 and the power supply 10.

The physical construction of the power switch 20 can be a wall switch, for example, a 86-type, 118-type panel switch, and a rotary, rocker, push, or touch wall switch. In the application of this technology, the wall switch is not limited to its specific form, and it only needs to be able to provide an on-off function.

Figure 5:
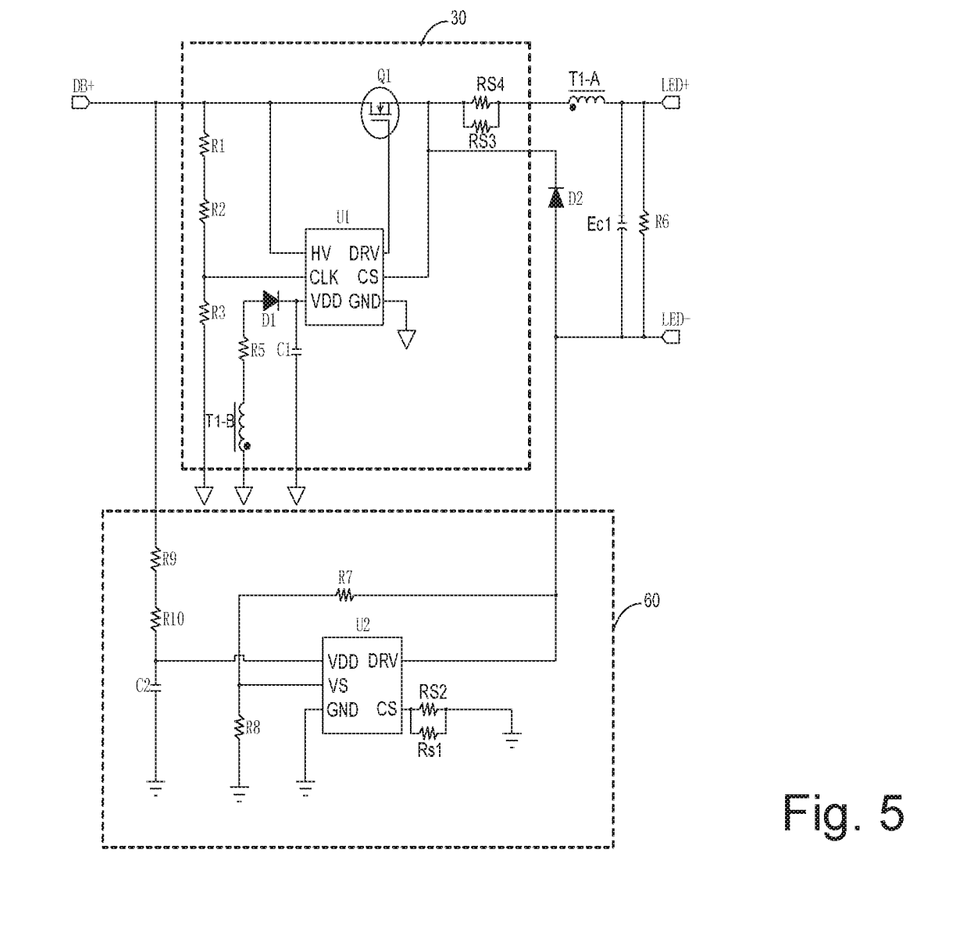
FIG. 5 is a circuit diagram of the continuous light dimming circuit.

In a specific embodiment, referring to FIG. 5, the leakage protection safety circuit 60 includes: a seventh resistor R7, an eighth resistor R8, a ninth resistor R9, a tenth resistor R10, a second capacitor C2, a first sampling resistor RS1, a second sampling resistor RS2 and the sampling drive chip U2. The power supply terminal VDD of the sampling drive chip U2 is connected to the first end of the second capacitor C2 and the first end of the tenth resistor R10. The second end of the tenth resistor R10 is connected to the first end of the ninth resistor R9.

The second end of the ninth resistor R9 is connected to the wall switch DB. The second end of the second capacitor C2 is grounded. The voltage sampling terminal VS of the sampling drive chip U2 is connected to the first end of the seventh resistor R7 and the first end of the eighth resistor R8. The second end of the eighth resistor R8 is grounded. The second end of the seventh resistor R7 is connected to the light source module 40. The ground terminal GND of the sampling drive chip U2 is connected to ground. The current sampling terminal CS of the sampling drive chip U2, is connected to the first terminal of the first sampling resistor RS1, and the first terminal of the second sampling resistor RS2 which are connected together. The second terminal of the first sampling resistor RS1 is connected to the second terminal of the second sampling resistor RS2 and both are commonly connected to ground. The driving signal terminal DRV of the sampling drive chip U2 is connected to the second terminal of the seventh resistor R7 and the anode of the second diode D2 as well as the first terminal of the first electrolytic capacitor EC1 and the sixth resistor R6. The first end of the light source module 40 is connected to the negative terminal LED−.

The seventh resistor R7 and the eighth resistor R8 constitute a voltage sampling unit. The first sampling resistor RS1 and the second sampling resistor RS2 constitute a current sampling unit. The sampling drive chip U2 serves as a leakage protection unit that calculates the equivalent impedance Zs of the grid. In general, the equivalent impedance of the power grid is between a few ohms to a dozen ohms. The equivalent impedance of the human body is roughly equal to 500 ohms. In the process of engineering installation and disassembly, the leakage protection safety circuit detects and calculates the equivalent impedance of the access point in real time. When the equivalent impedance Zs is less than the set value, it is determined that no human body is in contact with the power grid, and its built-in switch close circuit 20 (that is, the leakage switch unit) is closed, and the LED tube is normally connected. On the other hand, if the equivalent impedance Zs is greater than when the value is set, it is determined that a human body is in contact with the power grid, and its built-in power switch 20 will be turned on, and the LED tube will be disconnected from the power grid, thus avoiding electric shock.

Also as seen in FIG. 5, the driving circuit 30 includes a first resistor R1, a second resistor R2, a third resistor R3, a fifth resistor R5, a second inductor T1-B, a third sampling resistor RS3, and a fourth sampling resistor RS4, the first switch tube Q1, the first capacitor C1, and the light source drive chip U1. The first end of the first resistor R1, the high voltage input terminal HV of the light source drive chip U1, and the current of the first switch tube Q1 are connected to the input terminal and connected to the power switch 20. The second terminal of the first resistor R1 is connected to the first terminal of the second resistor R2. The second terminal of the second resistor R2 and the first terminal of the third resistor R3 are commonly connected to the light source driving chip and the clock signal terminal CLK of U1. The power terminal of the light source driving chip U1, the cathode LED of the first diode D1 and the first terminal of the first capacitor C1 are connected in common. The anode of the first diode D1 is connected to the fifth resistor R5. The first end of the fifth resistor R5 is connected to the first end of the second inductor T1-B. The second end of the second inductor T1-B, the second end of the third resistor R3, and the first capacitor and the second terminal of C1 are connected in common. The drive signal terminal DRV of the light source drive chip U1 is connected to the control terminal of the first switch tube Q1.

The current sampling terminal CS of the light source drive chip U1 is connected to the current output terminal of the first switch tube Q1, the first end of the third sampling resistor RS3, the first end of the fourth sampling resistor RS4, and the cathode of the second diode D2. The ground terminal GND of the light source driving chip U1 is grounded. The second end of the third sampling resistor RS3 and the second end of the fourth sampling resistor RS4 is connected to the first end of the first inductor T1-A. The second end of the first inductor T1-A is connected to the second end of the first electrolytic capacitor EC1, and the second end of the sixth resistor R6, which are commonly connected to the positive terminal LED+ of the light source module 40.

The first resistor R1, the second resistor R2, and the third resistor R3 form a sampling circuit to detect the on and off of the power switch 20. The light source drive chip U1 has a built-in timing unit 31. The pulse trigger unit 32, the latch unit 33, and the light source drive unit 34 operate according to the state of the power switch 20. The light source drive signal is generated at the first turn-on time in the turn-on-turn-turn-on operation to adjust the brightness of the light source module 40.

Figure 6:
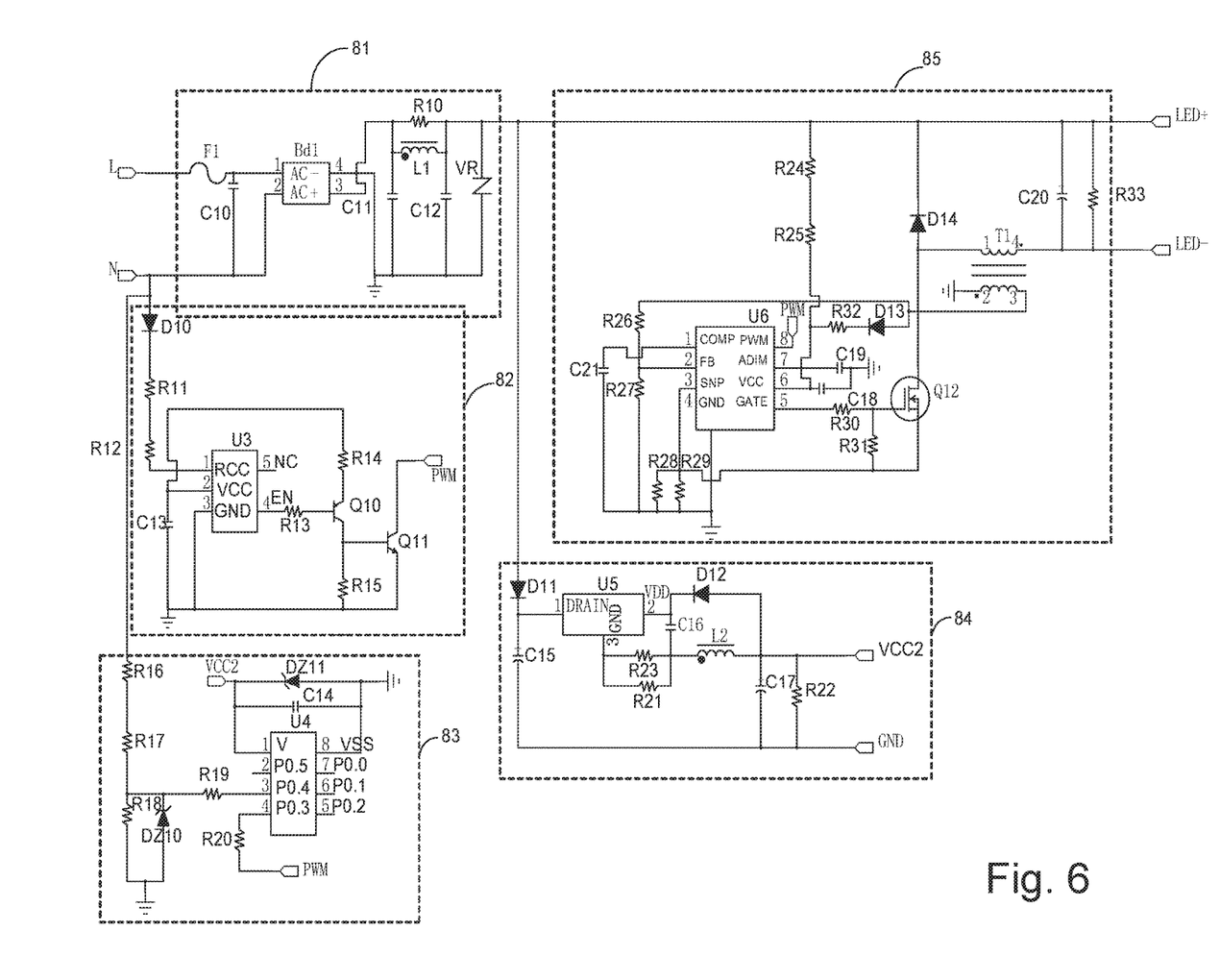
FIG. 6 is circuit diagram of the continuous light dimming circuit.

As seen in FIG. 6, the light source driving circuit in this embodiment may also include a rectifier circuit 81. Specifically, the rectifier circuit 81 is connected to the power supply 10 having a load line and neutral line. The rectifier circuit 81 filters and rectifies the output AC signal. The fuse F1 is connected to the live wire output terminal L of the power supply 10. The tenth capacitor C10 is connected in parallel with the power supply 10.

Rectifier bridge BD1 and fuse F1 are both connected to rectify the AC power. The resistor R10, the variable resistor VR, the first inductor L1, the eleventh capacitor C11, and the twelfth capacitor C12 form a it-type filter circuit to filter the output signal after rectification.

Also as shown in FIG. 6, the leakage protection circuit 82 is another leakage protection safety circuit provided by this embodiment of the application, in which the tenth diode D10, the eleventh resistor R11, and the twelfth resistor R12 are sequentially connected to form a signal acquisition circuit. The circuit is connected to the input pin RCC of the leakage protection chip U3. The output pin EN of the leakage protection chip U3 is connected to the control terminal of the tenth switch tube Q10 through the thirteenth resistor R13, and the current input terminal of the tenth switch tube Q10. The fourteenth resistor R14 is connected to the power pin of the leakage protection chip U3. The current output end of the tenth switch tube Q10 and the first end of the fifteenth resistor R15 are connected to the control end of the eleventh switch tube Q11. The second end of the fifteenth resistor and the first end of the thirteenth capacitor C13, the ground pin GND of the leakage protection chip U3, and the current output end of the eleventh switch tube Q11 are connected to the ground and the second end of the thirteenth capacitor C13. The terminal is connected to the power supply pin VCC of the leakage protection chip U3.

The leakage protection circuit 82 collects the voltage signal in the power supply 10 through the signal acquisition circuit, and calculates the equivalent impedance Zs of the power grid. In general, the equivalent impedance of the power grid is between a few ohms to a dozen ohms whereas the equivalent impedance of the human body is roughly equal to 500 ohms. In the process of engineering installation and disassembly, the leakage protection safety circuit detects and calculates the equivalent impedance of the access point in real time. If the equivalent impedance Zs is less than the set value, it is determined that no human body is in contact with the power grid. At this time, the level of the output pin EN is high on the leakage protection chip U3, the tenth switching tube Q10 is turned off, and the eleventh switching tube Q11 is turned off The output signal of the leakage protection circuit 82 does not affect the PWM signal of the output terminal of the main control circuit 83, and the LED lights and thus the tube is normally connected. On the other hand, if the equivalent impedance Zs is greater than the set value, it is determined that a human body is in contact with the power grid. At this time, the level of the output pin EN of the leakage protection chip U3 is high, and the tenth switching tube Q10 is turned off. The eleventh switching tube Q11 is turned on, and the leakage protection circuit 82 pulls the PWM signal of the output terminal of the main control circuit 83 to ground, and the LED tube is disconnected from the power grid, thereby avoiding electric shock. The tenth switch tube Q10 can be a PNP type transistor, and the eleventh switch tube Q11 can be an NPN type transistor.

As seen in FIG. 6, the main control circuit 83 and the main power circuit 85 in can form a driving circuit. Specifically, the main control circuit 83 detects the on time and off time of the switch circuit and generates a dimming signal according to the on time and the off time. The main power circuit 85 generates a light source driving signal according to the dimming signal to drive the light source module to light. The main control circuit 83 may have a timing unit, a pulse trigger unit, and a latch unit. The pulse trigger signal may be sent to the main power circuit 85 as a dimming signal, and the main power circuit 85 may be the light source de-drive unit that generates the light source drive signal according to the pulse trigger signal number.

Specifically, in a specific application embodiment, referring to FIG. 6, the main control circuit 83 includes a control chip U4, sixteenth resistor R16, seventeenth resistor R17, eighteenth resistor R18, nineteenth resistor R19, tenth voltage regulator ZD10, twentieth resistor R20, eleventh voltage regulator ZD11, and fourteenth capacitor C14. The first end of the sixteenth resistor R16 is connected to the power supply 10, and the second end of the sixteenth resistor R16 is connected to the first end of the seventeenth resistor R17. The second end of the seventeenth resistor R17, the first end of the eighteenth resistor R18, the first end of the nineteenth resistor R19 and the cathode of the tenth zener tube ZD10 are connected together. The second end of the eighteenth resistor R18 is connected to the anode of the tenth zener tube ZD10 which are commonly connected to ground. The second end of the nineteenth resistor R19 is connected to the input pin IN of the main control chip U4. The power supply pin of the main control chip U4, the first end of the fourteenth capacitor, and the eleventh voltage regulator tube, and the cathode of diode ZD11 are connected to the power supply circuit 84. The anode of the eleventh voltage regulator ZD11, the second end of the fourteenth capacitor C14 and the ground pin VSS of the main control chip U4 are connected together. The output pin of the main control chip U4 OUT is connected to the main power circuit 85 through the twentieth resistor R20.

In this embodiment, the main control chip U4 is used as the dimming signal unit, in which the program is pre-installed, the sixteenth resistor R16, the seventeenth resistor R17, the eighteenth resistor R18, the nineteenth resistor R19, and the tenth diode ZD10 form a signal acquisition circuit to detect the switch of the line. When the wall switch is turned on, the main control chip U4 is powered on, and the main control chip U4 outputs a PWM signal through its output pin OUT to control the main power circuit 85 drive so that the light source module lights up. Specifically, in the intelligent dimming time interval, the PWM dimming signal will continue to increase from 1% to 100%, and the corresponding constant current drive unit (that is, the main power 85) obtains the dimming signal from the PWM dimming interface and adjusts the output current synchronously, so that the LED the lamp gradually increases from the lowest brightness to 100% brightness.

If the wall switch is turned off during the smart dimming time interval, that is, during the period when the dimming signal unit outputs a changing PWM signal, the PWM signal before the system is powered off will be temporarily latched. Similarly, if the wall switch is turned on before the latch time interval arrives, the system is powered on again. Then the dimming signal unit directly outputs the PWM dimming signal latched before the system is powered off. Correspondingly, the output brightness of the LED tube is also the brightness before the system is powered off. In this way, the LED tube can be selected from the lowest brightness to 100% brightness. If the wall switch is turned on again after the latch time interval is reached, the latch signal in the dimming signal unit will be reset. At this time, the dimming signal unit will enter the smart dimming time interval again, that is, the output PWM signal will start over from 1% again and gradually increase upward.

As seen in FIG. 6, the light source driving circuit may further include a power supply circuit 84 used to convert the direct current output by the rectifier circuit 81 into a power supply signal to supply power to the main control circuit 83. The power supply circuit 84 includes a power supply chip U5, an eleventh diode D11, a twelfth diode D12, a fifteenth capacitor C15, and a sixteenth capacitor C16, the seventeenth capacitor C17, the twenty-first resistor R21, the twenty-second resistor R22, the twenty-third resistor R23, and the second inductor L2. The anode of the eleventh diode D11 connects to the rectifier circuit 81. The cathode of the eleventh diode D11, the first end of the fifteenth capacitor C15 and the input pin DRAIN of the power supply chip U5 are connected together.

The ground pin GND of the power supply chip U5, the first end of the twenty-first resistor R21, and the first end of the twenty-third resistor R23 are connected together. The second end of the twenty-first resistor R21, the second end of the twenty-third resistor R23, the first end of the second inductor L2, and the first end of the sixteenth capacitor C16 are connected in common. The output pin OUT of the power supply chip U5, the second end of the sixteenth capacitor C16 and the cathode of the twelfth diode D12 are connected in common. The second end and the second end of the second inductor L2 are connected in common. The anode of the twelve diode D12, the first end of the seventeenth capacitor C17, and the first end of the twenty-second resistor R22 are commonly connected. The output terminal VCC2 of the power supply circuit 84 is connected to the main control circuit 83.

The power supply chip U5 mainly performs voltage conversion on the DC power output by the rectifier circuit 81, conversion processing, and output the corresponding DC signal to supply power to the main control circuit 83. The rectifier circuit 81 the output high-voltage DC voltage is converted into a 5V DC signal to supply power to the main control chip U4.

In a specific application embodiment, referring to FIG. 6, the main power circuit 85 includes: a main power core chip U6, twenty fourth resistor R24, twenty fifth resistor R25, twenty sixth resistor R26, twenty seventh resistor R27, twenty eighth resistor R28, twenty ninth resistor R29, thirtieth resistor R30, a thirty-first resistor R31, thirty-second resistor R32, eighteenth capacitor C18, nineteenth capacitor C19, twentieth capacitor C20, twenty-first capacitor C21, fourteenth diode D14, thirteenth diode D13, twelfth switching tube Q12 and the first transformer T1. The first terminal of the twenty-fourth resistor R24, the cathode of the fourteenth diode D14, and the first terminal of the twentieth capacitor C20 terminal and the first terminal of the thirty-second resistor R32 are commonly connected. The output terminal of the rectifier circuit 81 and the positive input terminal LED+ of the light source module 40, the second terminal of the twenty-fourth resistor R24 are commonly connected. The twenty-fifth resistor R25 is connected to the twenty-fourth resistor R24. The second end of the twenty-fifth resistor R25, the first end of the thirty-second resistor R32, the first end of the eighteenth capacitor C18, and the power pin VCC of the main power chip U6 are connected together. The signal modulation pin ADM of the power chip U6 is connected to the first end of the nineteenth resistor. The second end of the eighteenth capacitor C18 and the second end of the nineteenth capacitor C19 are both connected to the ground.

The pulse of the main power chip U6, and the wide modulation signal input pin PWM are connected to the main control circuit 83. The light source drive signal pin GATE of the main power chip U6 is connected to the first end of the thirtieth resistor R30. The second end of thirtieth resistor R30, the first end of a resistor R31 and the control end of the twelfth switch tube Q12 are connected together. The second end of the thirty-second resistor R32 is connected to the cathode of the thirteenth diode D13. The anode, the first end of the twenty-sixth resistor R26 and the first end of the main winding of the first transformer T1 are connected together. The second end of the main winding of the first transformer T1 is grounded, and the current input end of the twelfth switch tube Q12, the first end of the secondary winding of the first transformer T1 and the anode of the fourteenth diode D14 are commonly connected. The second end of the secondary winding of the first transformer T1, the second end of the twentieth capacitor C20, and the second end of the thirty-two resistor R32 are connected. The negative input of the light source module LED−, the feedback pin FB of the main power chip U6, the first end of the twenty-sixth resistor R26, and the second end of the twenty-seventh resistor R27 are connected in common. The first end of the compensation signal pin COMP of the main power chip U6 is connected to the first end of the twenty-first capacitor C21. The sampling pin SNP of the main power chip U6, the first end of the twenty-eighth resistor R28, the first end of the twenty-ninth resistor R29, the first end of the thirty-first resistor R31, and the twelfth switch Q12 are connected together. The current output terminal of the main power chip U6, the second end of the twenty-eighth resistor R28, the second end of the twenty-ninth resistor R29, and the second end of the twenty-first capacitor C21 are connected together.

A BUCK driving circuit is formed by the main power chip U6 and its peripheral circuits. Specifically, the main power chip U6 receives the dimming signal sent by the main attack circuit 83, and controls the light source module 40 according to the dimming signal. The operating voltage and operating current are adjusted so that the brightness of the light source module 40 corresponds to the dimming signal.

Figure 7:
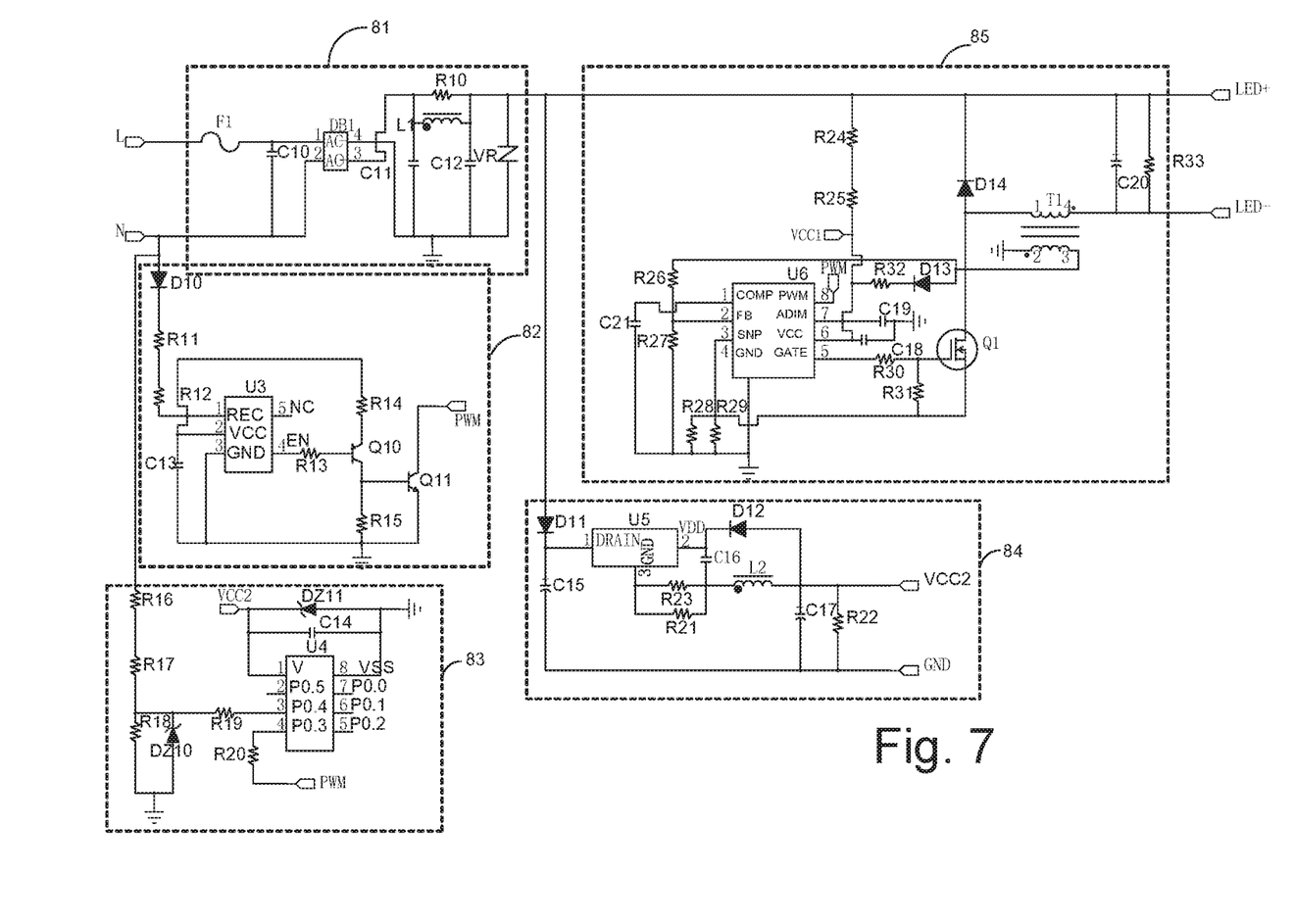
FIG. 7 is circuit diagram of the continuous light dimming circuit.

As shown in FIG. 7, the output terminal of the leakage protection circuit 82 can also be connected to the power supply terminal VCC1 of the main power circuit 85, and the power supply terminal VCC1 can be connected to the power supply pin VCC of the main power chip U5. If the user gets an electric shock, the leakage protection circuit 82 pulls the output terminal of the power supply circuit 84 down to the ground, so that the main power circuit 85 is powered off, the light source module 40 stops working, and its power supply port is pulled down to the ground. This provides a safety circuit to avoid potential electrical safety hazards.

The output terminal of the leakage protection circuit 82 may also be connected to the output terminal VCC2 of the power supply circuit 84. When a user gets an electric shock, the leakage protection circuit 82 will power the circuit the output terminal of 84 is pulled down to ground. When the main control circuit 83 is powered off, and its output terminal PWM stops outputting the dimming signal, this further controls the main power circuit 85 to power off.

The units described as separate components may or may not be physically separate, as the components displayed by the unit may or may not be a physical unit, that is, they may be located in one place, or they may be distributed to multiple network units. Some or all of the units can be selected according to actual needs to achieve the purpose of the solution of the embodiment. In addition, the functional units in the various embodiments of the present application may be integrated into one processing unit, or each unit may exist alone physically, or two or more units may be integrated into one unit. The above-mentioned integrated unit can be realized in the form of hardware or software functional unit.

The invention claimed is:

1. A light dimming circuit having a continuous dimming function comprising:
   a. a power supply;
   b. a light source module formed as a lamp;
   c. a power switch, wherein the power switch is connected to a power supply and configured to receive a user input when the user turns on and turns off power;
   d. a light source drive circuit, wherein the light source drive circuit is connected to the power switch and the light source module, wherein the light source drive circuit is configured to:
      i. detect a switch on time and a switch off time;
      ii. generate a light source drive signal according to the switch on time and the switch off time;
      iii. save the light source drive signal; and
      iv. drive the light source module to illuminate, wherein the light source drive signal controls a brightness of the light source module, wherein the brightness of the light source module is adjusted to provide the continuous dimming function according to the switch on time and the switch off time, wherein the light dimming circuit further comprises: a. a timing unit for timing the switch on time and the switch off time of the switch circuit, wherein the timing unit is configured to: i. compare the switch on time and the switch off time with a preset intelligent dimming interval time to generate a first comparison result; and ii. compare the switch on time and the switch off time with a preset latch interval time to generate a second comparison result; b. a pulse trigger unit, wherein the pulse trigger unit is connected to the timing unit, wherein the pulse trigger unit is configured to generate a pulse trigger signal based on the first comparison result and the second comparison result; c. a latch unit, wherein the latch unit saves the pulse trigger signal; and d. a light source driving unit, wherein the light source drive unit is connected to the pulse trigger unit and the latch unit, and is configured to generate a light source drive signal based on the pulse trigger signal.

2. The light source driving circuit of claim 1, wherein the light dimming circuit further comprises: a latch reset unit, wherein the latch reset unit is connected to the timing unit and the latch unit, wherein the latch reset unit is configured to reset the latch unit according to the second comparison result.

3. The light source driving circuit of claim 1, wherein the light dimming circuit further comprises: a display circuit, wherein the display circuit is connected to the pulse trigger unit, wherein the display circuit generates a pair of display signals to illuminate an indicator light.

4. The light source driving circuit of claim 1, wherein the light dimming circuit further comprises a leakage protection safety circuit, wherein the leakage protection safety circuit is configured to:
   a. sample a voltage and a current of the power supply to generate a grid impedance value;
   b. compare the grid impedance value with a preset impedance threshold; and
   c. control a connection state between the light source module and the power supply.

5. The light source driving circuit of claim 1, wherein the leakage protection safety circuit comprises:
   a. a voltage sampling unit, wherein the voltage sampling unit is configured to sample voltage on the power supply to generate a voltage sampling signal;
   b. a current sampling unit, wherein the current sampling unit is configured to perform current sampling on the power supply to generate a current sampling signal;
   wherein the leakage protection safety circuit is connected to the voltage sampling unit and the current sampling unit, wherein the leakage protection safety circuit is configured to receive a voltage sampling signal and a current sampling signal to generate a grid impedance value, wherein the grid impedance value is compared with a preset impedance threshold, wherein a leakage protection signal is generated according to the grid impedance value, wherein the leakage protection signal adjusts the light source driving signal.

6. The light source driving circuit of claim 5, wherein the leakage protection safety circuit further comprises: a leakage switch unit, wherein the leakage switch unit is connected to the leakage protection unit and receives the leakage protection signal and controls a connection state between the light source module and the power supply according to the leakage protection signal.

7. The light source driving circuit of claim 1, wherein the power switch is a wall switch.

* * * * *